(12) United States Patent
Guerrero et al.

(10) Patent No.: US 11,067,063 B2
(45) Date of Patent: Jul. 20, 2021

(54) EMBEDDED CONDUCTIVE WIRES IN POLYMER ARTIFICIAL MUSCLE ACTUATING DEVICES

(71) Applicant: Lintec of America, Inc., Richardson, TX (US)

(72) Inventors: Marilu Guerrero, Richardson, TX (US); Sergey Li, Richardson, TX (US); Randy Allen, Richardson, TX (US); Anthony Hingeley, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 0 days.

(21) Appl. No.: 16/766,100

(22) PCT Filed: Nov. 21, 2018

(86) PCT No.: PCT/US2018/062242
§ 371 (c)(1),
(2) Date: May 21, 2020

(87) PCT Pub. No.: WO2019/104164
PCT Pub. Date: May 31, 2019

(65) Prior Publication Data
US 2020/0362836 A1    Nov. 19, 2020

Related U.S. Application Data

(60) Provisional application No. 62/590,121, filed on Nov. 22, 2017.

(51) Int. Cl.
F03G 7/06     (2006.01)

(52) U.S. Cl.
CPC .................... F03G 7/06 (2013.01)

(58) Field of Classification Search
CPC .................... F03G 7/06; F03G 7/005
(Continued)

(56) References Cited

U.S. PATENT DOCUMENTS 8,607,561 B2 * 12/2013 Walls-Bruck ........... F03G 7/065
                                                          60/527
2003/0212394 A1 * 11/2003 Pearson ............. A61B 18/1477
                                                          606/41

(Continued)

FOREIGN PATENT DOCUMENTS

| EP | 2463090 A1 | 6/2012 |
|---|---|---|
| JP | H11-215793 A | 8/1999 |

(Continued)

OTHER PUBLICATIONS

International Search Report issued in corresponding International Application No. PCT/US2018/062242 dated Mar. 15, 2019 (4 pages).

(Continued)

*Primary Examiner* — Hoang M Nguyen
(74) *Attorney, Agent, or Firm* — Greenblum & Bernstein, P.L.C.

(57) ABSTRACT

An actuating device and a method for manufacturing an actuating device, where the method includes wrapping a conductive wire (204) around a polymer fiber (202) at a set tension, and heating the polymer fiber and wire to a temperature that exceeds the glass transition temperature of the polymer fiber for a predetermined amount of time to partially embed the conductive wire into the polymer fiber. The method also includes cooling the polymer fiber and wire to below the glass transition temperature resulting in a wired polymer fiber wherein at least part of the conductive wire is embedded in the polymer fiber.

19 Claims, 2 Drawing Sheets

(58) Field of Classification Search
USPC .................................................. 60/527–529
See application file for complete search history.

(56) References Cited

U.S. PATENT DOCUMENTS

| | | | | |
|---|---|---|---|---|
| 2007/0132387 | A1* | 6/2007 | Moore | H01J 11/00 |
| | | | | 313/582 |
| 2007/0289768 | A1* | 12/2007 | Moore | G02F 1/13334 |
| | | | | 174/98 |
| 2009/0139987 | A1* | 6/2009 | Handa | H05B 6/06 |
| | | | | 219/628 |
| 2012/0032553 | A1 | 2/2012 | Goyal et al. | |
| 2013/0002090 | A1 | 1/2013 | Hino et al. | |
| 2015/0198907 | A1* | 7/2015 | Hino | D01D 5/0007 |
| | | | | 492/18 |
| 2015/0369264 | A1* | 12/2015 | Felt | B25J 9/1075 |
| | | | | 92/90 |

FOREIGN PATENT DOCUMENTS

| | | |
|---|---|---|
| JP | 2010-500895 A | 1/2010 |
| JP | 2011-37077 A | 2/2011 |
| JP | 2012-005340 A | 1/2012 |
| JP | 2012-39741 A | 2/2012 |
| JP | 2017-174651 A | 9/2017 |

OTHER PUBLICATIONS

Written Opinion of the International Searching Authority issued in corresponding International Application No. PCT/US2018/062242 dated Mar. 15, 2019 (6 pages).

English translation of the International Preliminary Report on Patentability issued in corresponding International Patent Application No. PCT/US2018/062242, dated Jun. 4, 2020 (8 pages).

Office Action for JP App. No. 2020-528054, dated May 10, 2021 (w/ translation).

* cited by examiner

EMBEDDED CONDUCTIVE WIRES IN POLYMER ARTIFICIAL MUSCLE ACTUATING DEVICES

CROSS REFERENCE TO RELATED APPLICATIONS

This is a national stage application of International Patent Application No. PCT/US2018/062242, filed on Nov. 21, 2018, and claims priority to U.S. Provisional Patent Application No. 62/590,121, filed on Nov. 22, 2017. The contents of these applications are hereby incorporated by reference in its entirety.

In addition, the material of the following applications may be used in conjunction with embodiments disclosed herein: U.S. Provisional Application No. 62/431,717, entitled "IMPROVEMENTS IN ARTIFICIAL MUSCLE ACTUATORS"; U.S. Provisional Application No. 62/350,113, entitled "POLYMERIC ACTUATOR DEVICE, CONTROLLED MOTION AND METHODS THEREOF"; U.S. Provisional Application No. 62/405,138, entitled "COATING FOR ARTIFICIAL MUSCLES AND ACTUATORS"; WIPO Application No. PCT/US2017/030199, filed on Apr. 28, 2017; as well as U.S. Provisional Application No. 62/577,512, filed on Oct. 26, 2017. These applications are also incorporated by reference in their entirety.

BACKGROUND

Thermally driven torsional actuators based on twisted polymeric fibers and yarns have a wide range of applications. Artificial muscle actuators comprising twisted and/or coiled polymers have the advantage of low cost, high production volume, and design simplicity. Artificial muscle actuators may have advantages over small motors because of the greatly simplified engineering and lower product costs.

SUMMARY

In one aspect, embodiments of the invention relate to an actuating device that includes a polymer fiber and a conductive wire, where the conductive wire is wrapped around the polymer fiber so that at least part of the conductive wire is embedded into the polymer fiber.

In another aspect, embodiments of the invention relate to a method for manufacturing an actuating device that includes wrapping a conductive wire around a polymer fiber at a set tension, and heating the polymer fiber and wire to a temperature that exceeds the glass transition temperature of the polymer fiber for a predetermined amount of time. The method also includes cooling the wired polymer fiber to below the glass transition temperature resulting in a wired polymer fiber where at least part of the conductive wire is embedded in the polymer fiber.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the invention. However, it will be apparent to one of ordinary skill in the art that the disclosure may be practiced without these specific details. In other instances, well-known features have not been described in detail to avoid unnecessarily complicating the description.

In general, embodiments of the invention relate to an artificial muscle device and a method of making an artificial muscle device. More specifically, embodiments disclosed herein are directed to a method of embedding a wire-type conducting material into polymer based fiber.

In accordance with embodiments disclosed herein, to electrically actuate a thermally actuated polymer artificial muscle it is necessary to apply an electrically conductive material to the polymer muscle to act as a heater. For example, materials to use as a conductor include a silver coating, carbon nanotubes, and/or thin metal wires spirally wound around the polymer. In accordance with embodiments disclosed herein, thin metal wires spirally wound around the polymer fiber may be preferred for their relative low cost and durability. One issue with using a metal wire is that it may slide along the surface of the polymer. Also, if the wires slide closer together in a certain area of the fiber, they may cause overheating in that portion of the muscle, possibly damaging that portion with excessive heat. To ensure that the wire is spaced evenly along the length of the muscle, an adhesive may be used to secure the wire in place shortly after applying the wire.

However, although an adhesive prevents the wire from sliding along the polymer fiber surface, adhesives may be undesirable. Embodiments disclosed herein may avoid the use of an adhesive by embedding or partially embedding the wire inside the artificial muscle polymers. By embedding the wire inside the polymer fiber, embodiments may avoid using an adhesive and may increase the thermal contact between the wire and the polymer fiber. Embodiments disclosed herein also may protect the wire from damage caused by friction, as explained below.

Figure 1:
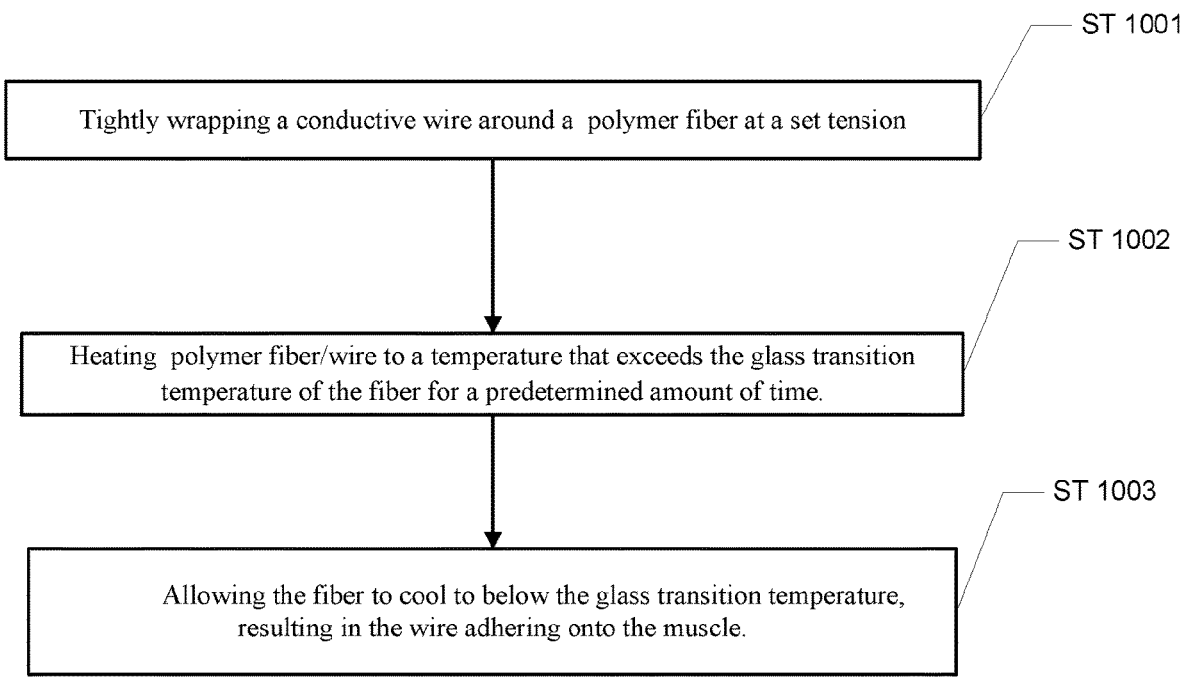
FIG. 1 is a flow chart in accordance with one or more embodiments disclosed herein.

FIG. 1 is a flow chart in accordance with one or more embodiments disclosed herein. In ST 1001, a conductive wire is tightly wound around the polymer fiber. In accordance with embodiments disclosed herein, the ratio of the diameter of the fiber relative to the diameter of the wire is about 10:1. The fiber may be 50 microns to 1 mm in diameter, while the wire may be 5 microns to 100 microns in diameter. When winding the wire, a tension of 5-10 MPa may be applied to wire. In accordance with one or more embodiments, the tension applied to the wire may help determine the embedding depth of the wire in the polymer fiber.

The wire may be partly or fully embedded into the fiber in accordance with one or more embodiments disclosed herein. In one or more embodiments, the embedding depth may be ~5% of the diameter of the wire. In ST 1002, the polymer fiber and wire are heated to a temperature that exceeds the glass transition temperature of the fiber for a predetermined amount of time. For example, the temperature may be 30-50 degree below melting point of polymer to embed the conductive wire and improve adhesion of metal wire to polymer fiber.

One of ordinary skill in the art will appreciate that the specific temperatures and times associated with the above Steps may vary in accordance with the materials selected for the polymer fiber and conductive wire, as well as the specific sizes of these materials. Further, one of ordinary skill will appreciate that the tension supplied in ST 1001 may depend on the material, temperatures, as well as the desired embedding depth of the conductive wire in the polymer fiber. For example, a higher tension may result in a deeper penetration of the conductive wire in the polymer fiber.

In ST 1003, the polymer fiber and wire are cooled to below the glass transition temperature, resulting in the wire adhering onto the muscle. Accordingly, the conductive wire is embedded into the polymer fiber, preventing the wire from sliding along the surface of the fiber in accordance with embodiments disclosed herein. By fully embedding the fiber in the surface of the polymer, the wire may be further protected more than when just partially embedded. In other words, the further embedded, the more the wire may be protected from outside influences.

Figure 2:
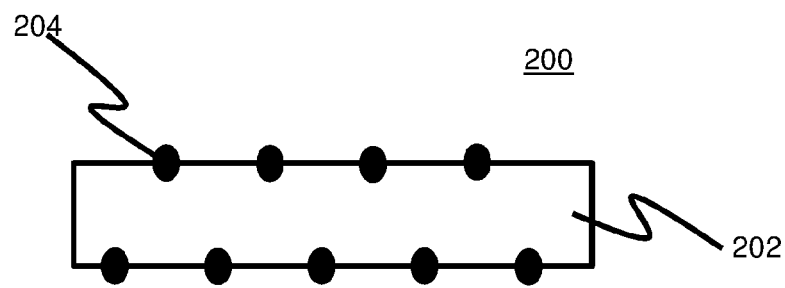
FIG. 2 is a schematic in accordance with one or more embodiments of the invention.

FIG. 2 is a schematic in accordance with one or more embodiments of the invention. FIG. 2 demonstrates a wired polymer fiber 200 that includes the polymer fiber 202 and a spirally wound, partially embedded wire 204. For example, a nylon polymer fiber may be 300-500 microns in diameter, and, and a stainless steel conductive wire of 76 microns in diameter may be used. In addition to nylon, other materials for the polymer fiber include, but are not limited to, Polyethylene, Polyvinylidene fluoride (PVDF), and PolyEtherEtherKetone (PEEK). In addition to stainless steel, materials for the polymer fiber include, but are not limited to, a nichrome alloy or other alloyed materials. One of ordinary skill in the art will appreciate that specific dimensions may be determined by the materials used, desired actuation, and/or specific application of the actuating device.

As noted above, the annealing temperature may also be varied based on these factors in accordance with one or more embodiments of the invention. For example, a nylon polymer fiber may be heated to 200° C. for an hour or less in ST 1002 described above. In addition, the tension may be controlled according to known techniques.

One of ordinary skill in the art will appreciate that the conductive wire may be wrapped around the polymer fiber in such a manner to provide a uniform heating of the polymer fiber. One will also appreciate that the conductive wire may be wrapped around the polymer fiber based on the desired actuation of the polymer fiber. For example, as noted above, without embedding the conductive wire, the conductive wires may slip along the polymer fiber and result in positions of the conductive wire being close together causing a more localized heating in a specific area of the polymer fiber. One of ordinary skill in the art will appreciate that the conductive wire may be wrapped around the polymer fiber to purposely cause more heating in one area of the polymer fiber as compared to other areas, based on the desired actuation of the polymer fiber.

In accordance with embodiments disclosed herein, when the wire is embedded into the polymer fiber, a greater surface area provides contact between the wire and the polymer fiber as compared to the wire was just wrapped around the exterior of the fiber. This greater surface contact may advantageously provide a faster heating rate and a more rapid actuation of the resulting actuation device in accordance with embodiments disclosed herein.

In addition, because a wire may just rest on the surface of the polymer fiber, it may be easier to fracture or break the wire. During manufacturing, the artificial muscle actuating device may experience a substantial amount of friction, which may result in the breaking of the wire or fiber. In fact, such breaking of the wire is known to happen frequently during manufacturing where the artificial muscle polymer fiber experiences a substantial amount of friction. Embodiments of the claimed invention embed the wire into the polymer fiber, making the artificial muscle fiber protected and not as vulnerable to friction during the manufacturing process.

While the invention has been described with respect to a limited number of embodiments, those skilled in the art, having benefit of this disclosure, will appreciate that other embodiments can be devised without departing from the scope of the invention as disclosed herein.

What is claimed is:

1. An actuating device comprising:
   a polymer fiber; and
   a conductive wire,
   wherein
   the conductive wire is wrapped around the polymer fiber, and
   at least part of the conductive wire is embedded into the polymer fiber.

2. The actuating device of claim 1, wherein at least 5% of the diameter of the conductive wire is embedded into the polymer fiber.

3. The actuating device of claim 1, wherein the conductive wire comprises one selected from the group of: stainless steel and nichrome alloy.

4. The actuating device of claim 1, wherein the polymer fiber comprises one selected from the group of: nylon, Polyethylene, Polyvinylidene fluoride, and PolyEtherEtherKetone.

5. The actuating device of claim 1, wherein the polymer fiber comprises nylon and the conductive wire comprises stainless steel.

6. The actuating device of claim 1, wherein the conductive wire is uniformly wrapped around the polymer fiber.

7. The actuating device of claim 1, wherein the conductive wire is non-uniformly wrapped around the polymer fiber based on a desired actuation.

8. The actuating device of claim 1, wherein a ratio of the diameter of the fiber relative to the diameter of the wire is about 10:1.

9. A method of manufacturing an actuating device, the method comprising:
   wrapping a conductive wire around a polymer fiber at a set tension;
   heating the polymer and conductive wire to a temperature that exceeds the glass transition temperature of the polymer fiber;
   cooling the polymer and conductive wire to below the glass transition temperature resulting in a wired polymer fiber wherein at least part of the conductive wire is embedded in the polymer fiber.

10. The method of claim 9, wherein the temperature is at least 50° C. below melting temperature of the polymer.

11. The method of claim 9, wherein the temperature is less or equal to 30° C. below the melting temperature of the polymer.

12. The method of claim 9, wherein at least 5% of the diameter of the conductive wire is embedded into the polymer fiber.

13. The method of claim 9, wherein the conductive wire comprises one selected from the group of: stainless steel and nichrome alloy.

14. The method of claim 9, wherein the polymer fiber comprises one selected from the group of: nylon, Polyethylene, Polyvinylidene fluoride, and PolyEtherEtherKetone.

15. The method of claim 9, wherein the polymer fiber comprises nylon and the conductive wire comprises stainless steel.

16. The method of claim 9, wherein the conductive wire is uniformly wrapped around the polymer fiber.

17. The method of claim 9, wherein the conductive wire is non-uniformly wrapped around the polymer fiber based on a desired actuation.

18. The method of claim 9, wherein a ratio of the diameter of the fiber relative to the diameter of the wire is about 10:1.

19. The actuating device of claim 1, wherein the polymer fiber has a diameter of from 50 μm 1 mm.

* * * * *